(12) United States Patent
Shimobayashi

(10) Patent No.: US 8,259,674 B2
(45) Date of Patent: Sep. 4, 2012

(54) MOBILE COMMUNICATION METHOD, MOBILE COMMUNICATION SYSTEM, AND MOBILE TERMINAL

(75) Inventor: Shinya Shimobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1074 days.

(21) Appl. No.: 12/159,342

(22) PCT Filed: Dec. 28, 2006

(86) PCT No.: PCT/JP2006/326406
§ 371 (c)(1),
(2), (4) Date: Jun. 26, 2008

(87) PCT Pub. No.: WO2007/077975
PCT Pub. Date: Jul. 12, 2007

(65) Prior Publication Data
US 2010/0172319 A1 Jul. 8, 2010

(30) Foreign Application Priority Data
Dec. 28, 2005 (JP) .................... 2005-377766

(51) Int. Cl.
*H04W 4/00* (2009.01)
(52) U.S. Cl. .................... 370/331; 370/333; 455/436
(58) Field of Classification Search .................. 370/329, 370/330, 331, 332, 333, 334; 455/436, 432.1
See application file for complete search history.

(56) References Cited

FOREIGN PATENT DOCUMENTS

| | | |
|---|---|---|
| EP | 1389885 A1 | 2/2004 |
| JP | 2003274135 A | 10/2003 |
| JP | 2004-072513 A | 3/2004 |
| JP | 2005328317 A | 11/2005 |
| JP | 2005347979 A | 12/2005 |
| WO | WO 2005041465 A1 | 5/2005 |

OTHER PUBLICATIONS

European Search Report dated Jan. 24, 2012 issued in European Application No. 06843775.5-2412.
3GPP TS 25.212 V6.7.0, Technical Specification Group Radio Access Network; Multiplexing and channel coding (FDD), Dec. 2005, 3rd Generation Partnership Project, Valbonne, France. XP050366758.
3GPP TS 25.308 V6.3.0, Technical Specification Group Radio Access Network; High Speed Downlink Packet Access (HSDPA); Overall description; Stage 2, Dec. 2004, 3rd Generation Partnership Project, Valbonne, France. XP050367593.
Qualcomm, Enhanced HSDPA Re-pointing Scheme, 3GPP TSG-RAN WG2 Meeting #48, Aug. 29-Sep. 2, 2005, London, United Kingdom. XP050129111.
Japanese Office Action dated Dec. 2, 2011 issued by the Japanese Patent Office in counterpart Japanese Application No. 2007-552995.

*Primary Examiner* — Kibrom T Hailu
*Assistant Examiner* — Dady Chery
(74) *Attorney, Agent, or Firm* — Sughrue Mion, PLLC

(57) ABSTRACT

A mobile communication method which allows a mobile station and a base station to communicate based on an HSDPA communication mode with a possibility of erroneous base station switching due to erroneous detection of a signal reduced to improve reliability of a mobile communication system, in which, when the mobile station moves from one base station into an area of other base station (S203), other base station as a moving destination transmits a dummy signal for notifying base station switching to the mobile station prior to transmission of actual information (S307), and the mobile station, in response to reception of the dummy signal, decodes an HS-SCCH signal up to part 2 information (S210), examines CRC included in the part 2 information, and when the CRC is normal (YES at S211), switches the base station (S213, S217).

7 Claims, 5 Drawing Sheets

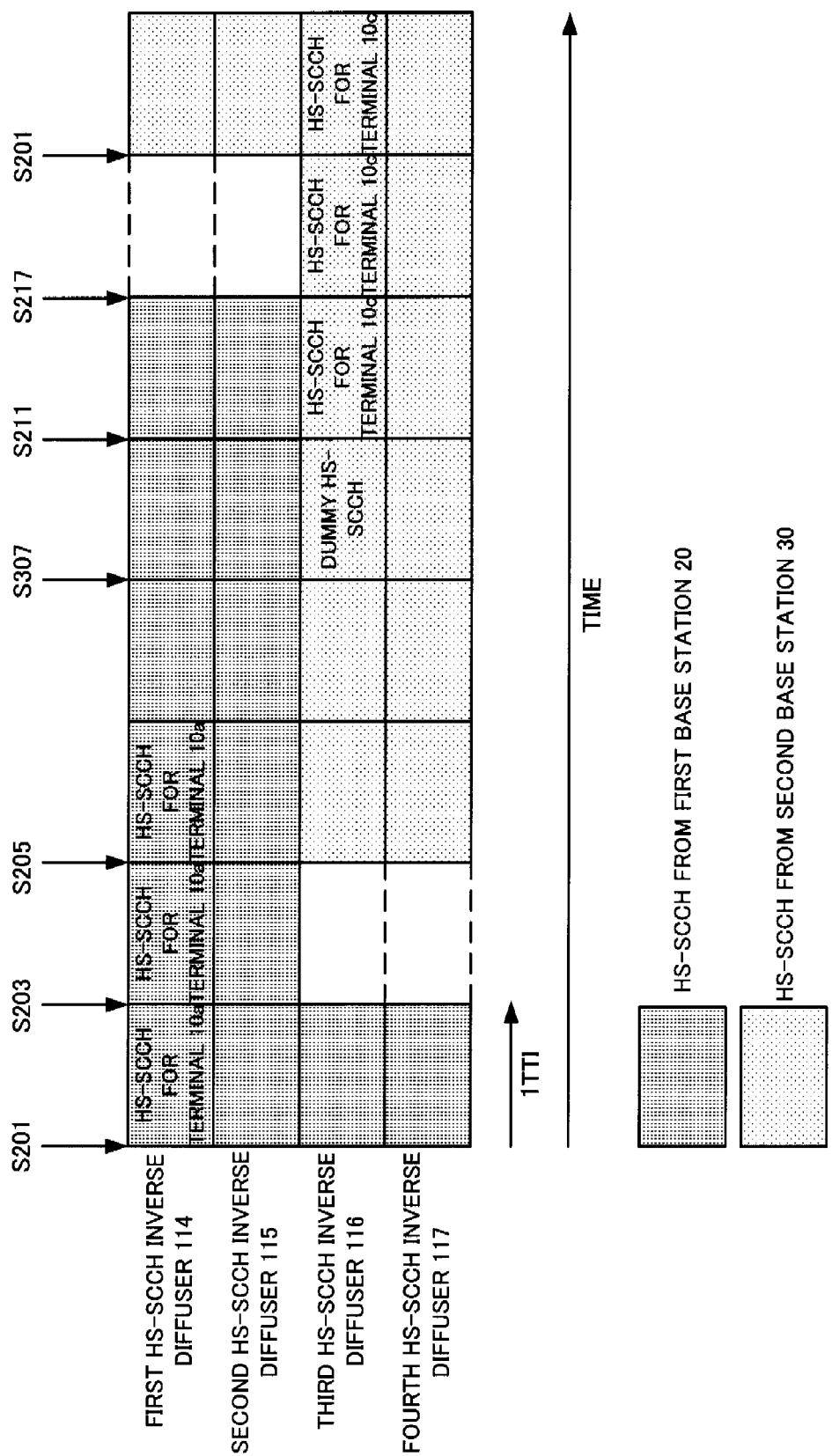

MOBILE COMMUNICATION METHOD, MOBILE COMMUNICATION SYSTEM, AND MOBILE TERMINAL

TECHNICAL FIELD

The present invention relates to a mobile communication method, a mobile communication system and a mobile terminal and, more particularly, a mobile communication method, a mobile communication system and a mobile terminal using an HSDPA (High Speed Downlink Packet Access) communication mode.

BACKGROUND ART

In an HSDPA communication mode whose standardization work is in progress based on 3GPP (3rd Generation Partnership Project), SHO (Soft Handover) is impossible and when a base station to which data is transmitted is changed due to shift of a terminal, HSDPA communication with a base station from which shift is made should be once cut off to make another connection with a base station to which the shift is made.

Accordingly, communication interruption time occurs at the time of switching a base station to hinder realization of real time service such as VoIP (Voice over IP) or the like on HSDPA. Under these circumstances, put on the table is HSDPA mobility enhancement as a mode for improving handover operation of HSDPA. Among them, consideration is given, as one mode of switching a communication destination base station, to a mode of receiving an HS-SCCH (High Speed Shared Control Channel) from both a base station from which shift is made and a base station to which the shift is made for a fixed time period and upon reception of HS-SCCH from the base station to which the shift is made, determining that an HSDPA serving cell is switched to thereafter execute HSDPA communication with the base station to which the shift is made.

One of handover methods as related art of HSDPA is recited, for example, in Literature 1. The handover method recited in Literature 1 includes an FCS requesting step of, when a mobile station in communication with a base station by a first cell detects a second cell of the same base station whose reception state is better than that of the first cell, transmitting an FCS request including second cell information, an FCS confirmation step of transmitting an FCS confirmation including FCS allowance information by using FCS-SCCH by a base station which has received an FCS request, a data transmission step of executing HARQ operation handover processing between the first cell and the second cell to transmit data yet to be transmitted by the second cell, and a data reception step of receiving data with a cell switched to the second cell by the mobile station which has received an FCS confirmation.

With this arrangement, a control procedure of FCS operation related to HSDPA and a signal transmission means are defined to realize improvement in efficiency and speed-up of handover.

Literature 1: Japanese Patent Laying-Open No. 2004-72513.

Among possible methods of avoiding a temporary cut-off of communication during handover processing is a method of, at the time of handover of HSDPA communication, receiving HS-SCCH from both a base station from which handover is made and a base station to which the handover is made for a fixed time period and when the HS-SCCH from the base station to which the handover is made includes self-directed data, determining that a base station is switched to thereafter receive HS-SCCH only from the base station to which the handover is made.

It is, however, necessary, at the time of confirming inclusion of self-directed data in HS-SCCH from the base station to which the handover is made as a base station switching determination criteria, to make determination based only on part 1 information of the HS-SCCH because HS-PDSCH (High Speed Physical Downlink Shared Channel) is transmitted before part 2 information of the HS-SCCH is all transmitted. The part 1 information, however, has no CRC (Cyclic Redundancy Check Code) added, so that error detection can not be checked to have a possibility of erroneous execution of base station switching.

In view of the above-described conditions, an object of the present invention is to provide a mobile communication method enabling a possibility of erroneous base station switching due to erroneous detection of a signal to be reduced to improve reliability of a mobile communication system. Another object of the present invention is to provide a mobile communication system enabling a possibility of erroneous base station switching due to erroneous detection of a signal to be reduced to improve reliability of the mobile communication system, and a mobile terminal thereof.

SUMMARY

According to a first exemplary aspect of the invention, a mobile communication method of allowing a mobile station and a base station to communicate based on an HSDPA communication mode, including when the mobile station moves from one base station into an area of other base station, transmitting a dummy signal for notifying base station switching from the other base station as a moving destination to the mobile station prior to transmission of actual information, in response to reception of the dummy signal, decoding an HS-SCCH signal up to part 2 information by the mobile station, examining CRC included in the part 2 information, and when the CRC is normal, switching the base station.

According to a second exemplary aspect of the invention, a mobile communication system including a control device for controlling a plurality of base stations in which a mobile station communicates with the plurality of base stations based on an HSDPA communication mode, wherein the control device includes a switching instruction unit for monitoring need/no-need of change of a base station connected to the mobile station while the mobile station moves from one base station into an area of other base station, and when the change is necessary, instructing the other base station on switching, the base station includes a generation unit for generating a dummy signal according to the switching instruction, and a transmission unit for transmitting the dummy signal to the mobile station, and the mobile station includes a reception unit for receiving the HS-SCCH signal, a determination unit for determining whether the dummy signal is included in the received HS-SCCH signal, a decoding unit for decoding the HS-SCCH signal up to part 2 information when the determination unit determines that the dummy signal is included, an examination unit for examining CRC included in the part 2 information, and a switching processing unit for switching the base station when the CRC is normal.

According to a third exemplary aspect of the invention, a mobile terminal for executing communication with a plurality of base stations based on an HSDPA communication mode, includes a reception unit for, when moving from one base station into an area of other base station, receiving an HS-SCCH signal from the base station as a moving destination, a determination unit for determining whether a dummy signal is included in the HS-SCCH signal received by the reception unit, a decoding unit for decoding the HS-SCCH signal up to part 2 information when the determination unit determines that the dummy signal is included, an examination unit for examining CRC included in the part 2 information, and a switching processing unit for switching the base station when the CRC is normal.

According to a fourth exemplary aspect of the invention, a communication program on a mobile terminal for executing communication with a plurality of base stations based on an HSDPA communication mode, which causes a computer realizing the mobile terminal to execute processing of receiving an HS-SCCH signal, when moving from one base station into an area of other base station, from the base station as a moving destination, processing of determining whether a dummy signal is included in the HS-SCCH signal received by the reception unit, processing of decoding the HS-SCCH signal up to part 2 information when determining that the dummy signal is included, processing of examining CRC included in the part 2 information, and processing of switching the base station when the CRC is normal.

BRIEF DESCRIPTION OF THE DRAWINGS

FIG. 5 is a diagram for use in explaining reception of HS-SCCH at the time of base station switching on the mobile terminal shown in FIG. 3.

EXEMPLARY EMBODIMENT

Figure 1:
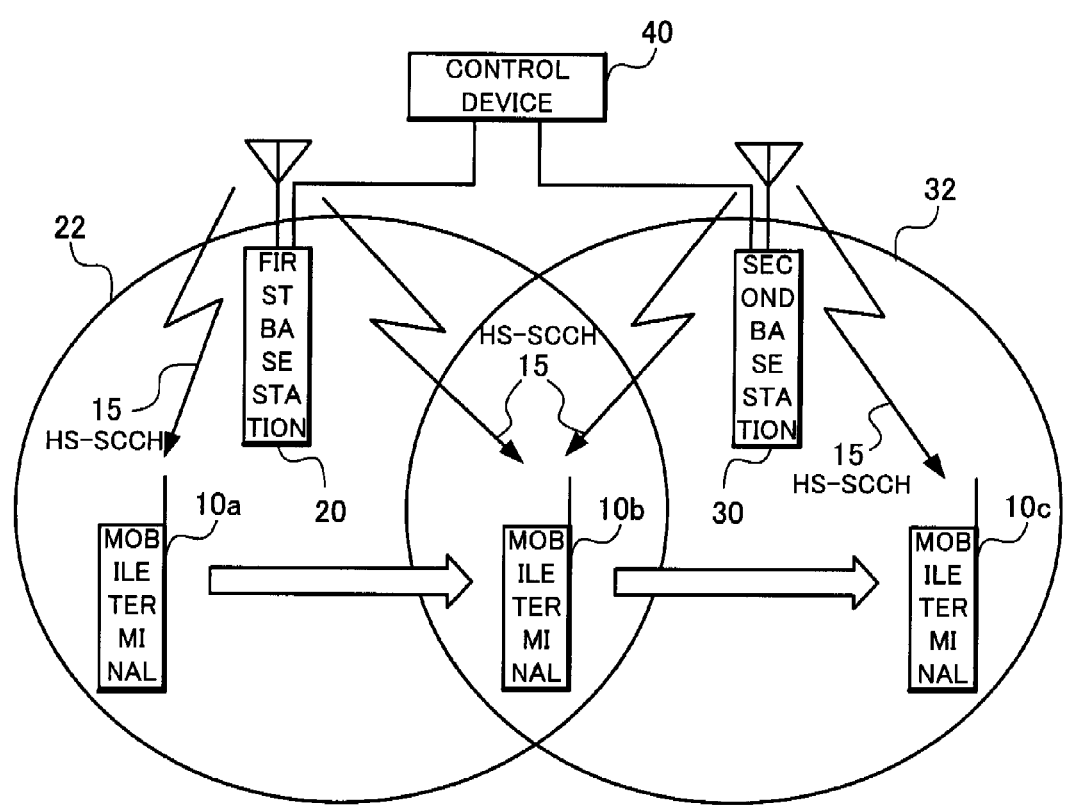
FIG. 1 is a block diagram showing a schematic structure of a mobile communication system according to an exemplary embodiment of the present invention.

In the following, an exemplary embodiment of the present invention will be described with reference to the drawings. In all the drawings, like components are indicated by the same reference numerals to appropriately omit description thereof.

FIG. 1 is a block diagram showing a schematic structure of a mobile communication system according to the exemplary embodiment of the present invention. The mobile communication system according to the present exemplary embodiment comprises a plurality of base stations, a first base station 20 and a second base station 30 here, a control device 40 for controlling the plurality of base stations, and a mobile terminal 10 which moves within areas of the plurality of base stations to communicate with the base stations (in the figure, it is indicated as ⌈a mobile terminal 10a⌋, ⌈a mobile terminal 10⌋ and ⌈a mobile terminal 10⌋. Hereinafter, it is simply referred to as ⌈the mobile terminal 10⌋ unless discrimination is required).

Shown in FIG. 1 is a state where the mobile terminal 10 existing in a first base station area 22 of the first base station 20 moves into a second base station area 32 of the second base station 30. Also shown is a state where an HS-SCCH (High Speed Shared Control Channel) 15 is transmitted to the mobile terminal 10 from each base station. In FIG. 1, discrimination is made among a mobile terminal in the first base station area 22 which is indicated as the mobile terminal 10a, a mobile station existing in an area between the first base station area 22 and the second base station 30 which is indicated as the mobile terminal 10b and a mobile terminal in the second base station area 32 which is indicated as the mobile terminal 10c.

The control device 40 instructs each base station to execute handover processing when the mobile terminal 10 moves from the first base station area 22 to the second base station area 32. More specifically, the control device 40 executes control to switch a connection between the mobile terminal 10 and the first base station 20 to a connection with the second base station 30.

In the mobile communication method according to the exemplary embodiment of the present invention, which is a mobile communication method of executing communication based on the HSDPA communication mode between a mobile station (the mobile terminal 10) and base stations (the first base station 20 and the second base station 30), when the mobile station (the mobile terminal 10) moves from one base station (the first base station 20) into an area of another base station (the second base station 30), the base station as a moving destination (the second base station 30) transmits a dummy signal to the mobile station (the mobile terminal 10) for notifying base station switching prior to transmission of actual information, and the mobile station (the mobile terminal 10) decodes an HS-SCCH signal up to part 2 information in response to the reception of the dummy signal to examine CRC included in the part 2 information, whereby the base station is switched when the CRC is normal.

Figure 2:
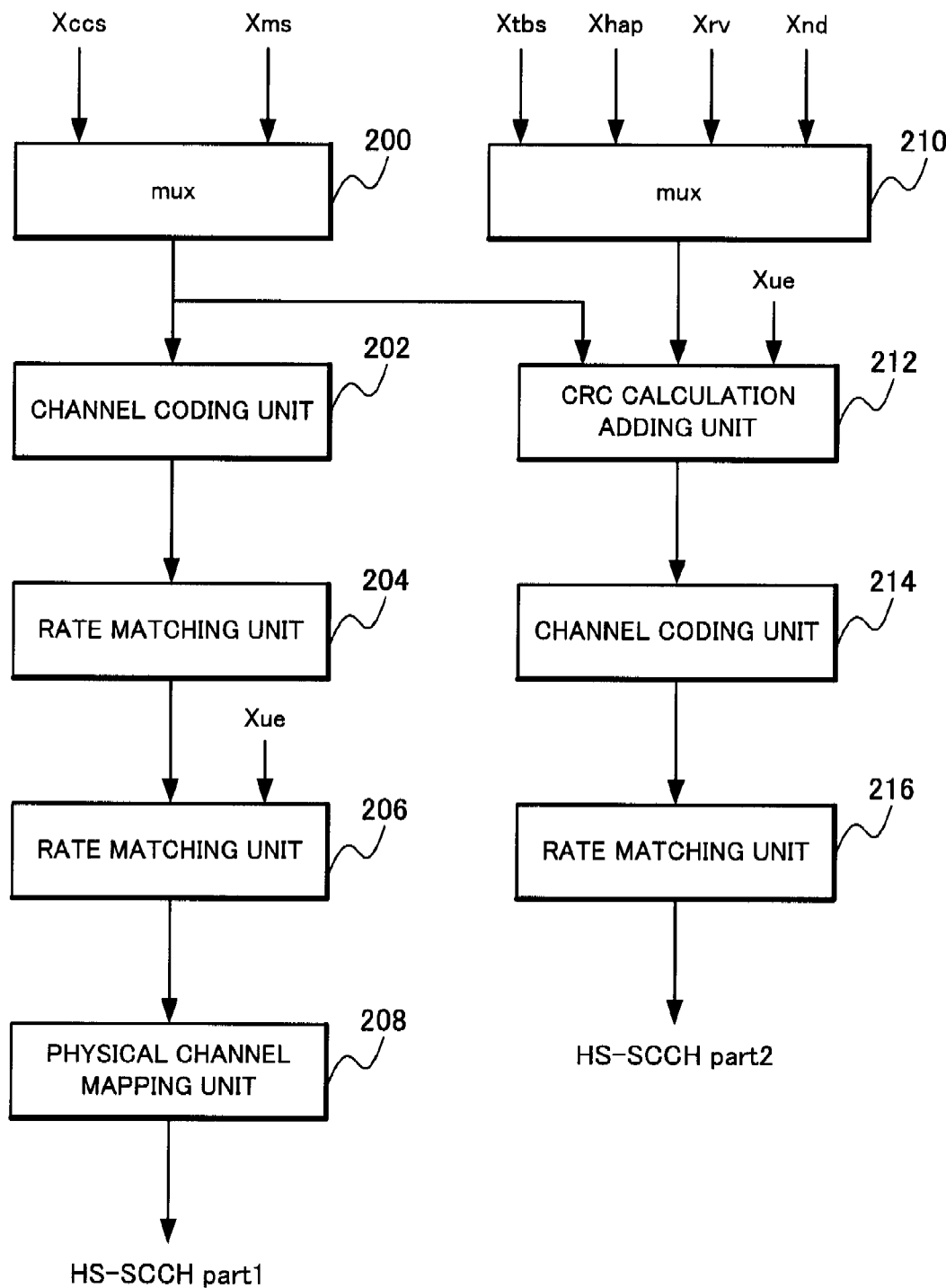
FIG. 2 is a diagram showing one example of a structure of an HS-SCCH coding processing unit at a base station according to the exemplary embodiment of the present invention.

FIG. 2 is a diagram showing one example of a structure of an HS-SCCH coding processing unit at the base station according to the exemplary embodiment of the present invention. Each base station comprises an HS-SCCH coding processing unit (not shown) to generate an HS-SCCH to be transmitted to the mobile terminal 10. In the present exemplary embodiment, an HS-SCCH is coded with a dummy signal included in part 1 information and transmitted to the mobile terminal 10. In FIG. 2, no description is made of structures of parts not related to the gist of the present invention. In addition, the respective components of the coding processing unit are realized by a CPU and a memory of an arbitrary computer, a program for realizing the components shown in the figure which is loaded into the memory, a storage unit such as a hard disk for storing the program, and an arbitrary combination of hardware and software centered around a network connection interface. Then, it is apparent to those skilled in the art that a realization method and a device therefor have various modifications. Each figure to be described in the following shows not a structure of a hardware unit but a block of a function unit.

The coding processing unit includes a multiplexer (mux) 200, a channel coding unit 202, a rate matching unit 204, a mask unit 206, a physical channel mapping unit 208, a multiplexer (mux) 210, a CRC calculation adding unit 212, a channel coding unit 214 and a rate matching unit 216.

The multiplexer 200 receives input of $X_{ccs}$ and $X_{ms}$ to generate an 8-bit bit string. Here, $X_{ccs}$ denotes a bit string indicative of a channelisation code set (CCS) for use in a corresponding HS-PDSCH, which is derived from the following expressions (1) and (2).

$$x_{ccs,1}, x_{ccs,2}, x_{ccs,3} = \min(P-1, 15-P) \quad \text{expression (1)}$$

$$x_{ccs,4}, x_{ccs,5}, x_{ccs,6}, x_{ccs,7} = |O+1\lfloor P/8 \rfloor * 15| \quad \text{expression (2)}$$

In the above-described expressions (1) and (2), P represents the number of codes of an HS-PDSCH and 0 represents the number of a first channelisation code among codes for use.

For a bit string indicative of a CCS which is derived from the above-described expressions (1) and (2), none of the eight bit strings, ⌈1110000⌉, ⌈1110001⌉, ⌈1110010⌉, ⌈1110011⌉, ⌈1110100⌉, ⌈1110101⌉, ⌈1110110⌉ and ⌈1110111⌉ is used. In the present invention, any of the above-described eight bit strings which are not used as a CCS is used as a bit string for indicating HSDPA serving cell switching.

More specifically, for including a dummy signal indicative of HSDPA serving cell switching in the part 1 information, $X_{ccs}$ is input to the multiplexer 200 as a bit string of any of the above-described eight bit strings. As a result, a dummy signal is included in the part 1 information of the HS-SCCH.

$X_{ms}$ is a bit indicative of an HS-PDSCH modulation scheme, which represents modulation by QPSK when indicating 0 and modulation by 16 QAM when indicating 1.

The channel coding unit 202 is a block for channel coding in which convolutional coding with a coding efficiency of ½ is executed to generate a 48-bit bit string.

The rate matching unit 204 is a block for rate matching, which thins out 48 bits generated by channel coding into 40 bits.

The mask unit 206 is a block which receives input of $X_{ue}$ (UE ID: User Equipment Identifier) to execute masking with UE ID (UE specific masking). The mask unit 206 calculates the exclusive OR of a 40-bit bit string generated from a 16-bit bit string (UE ID) inherent to a terminal which is notified from the terminal before reception of HSDPA and 40 bits generated by rate matching.

The physical channel mapping unit 208 is a block for executing mapping to a physical channel (physical channel mapping), which maps a generated 40-bit bit string to a first slot of a sub-frame of an HS-SCCH.

With this arrangement, the part 1 information of the HS-SCCH is generated.

Furthermore, the multiplexer 210 receives input of $X_{tbs}$, $X_{hap}$, $X_{rv}$ and $X_{nd}$ to generate a 13-bit bit string. $X_{tbs}$ is a bit representing a transport block size. $X_{hap}$ is a bit string indicative of the process number of hybrid ARQ. $X_{rv}$ is a bit indicative of Redundancy Version and Constellation. $X_{nd}$ is a new data indicator which indicates whether the data is new data or re-transmitted data by a change of a bit from that as of last time.

The CRC calculation adding unit 212 is a block for executing CRC calculation of transmission data and addition of the same. The CRC calculation adding unit 212 calculates a 16-bit CRC from a total of 21 bits including an 8-bit bit string formed of $X_{ccs}$ and $X_{ms}$ which are input from the multiplexer 200 and a 13-bit bit string formed of $X_{tbs}$, $X_{hap}$, $X_{rv}$ and $X_{nd}$ which is input from the multiplexer 210.

The calculated CRC is masked by a 16-bit UEID ($X_{ue}$). The CRC calculation adding unit 212 adds the masked 16-bit CRC to information bits of the 13-bit bit string formed of $X_{tbs}$, $X_{hap}$, $X_{rv}$ and $X_{an}$, which are input from the multiplexer 210 to output a 29-bit bit string.

The channel coding unit 214 is a block for channel coding, which executes ⅓ convolutional coding with respect to a total of 29 bits including 13 bits of the information bits and 16 bits of CRC to generate a 111-bit bit string.

The rate matching unit 216 is a block for rate matching, which thins out the 111 bits generated by the channel coding unit 214 into 80 bits.

This arrangement generates the part 2 information of the HS-SCCH.

Figure 3:
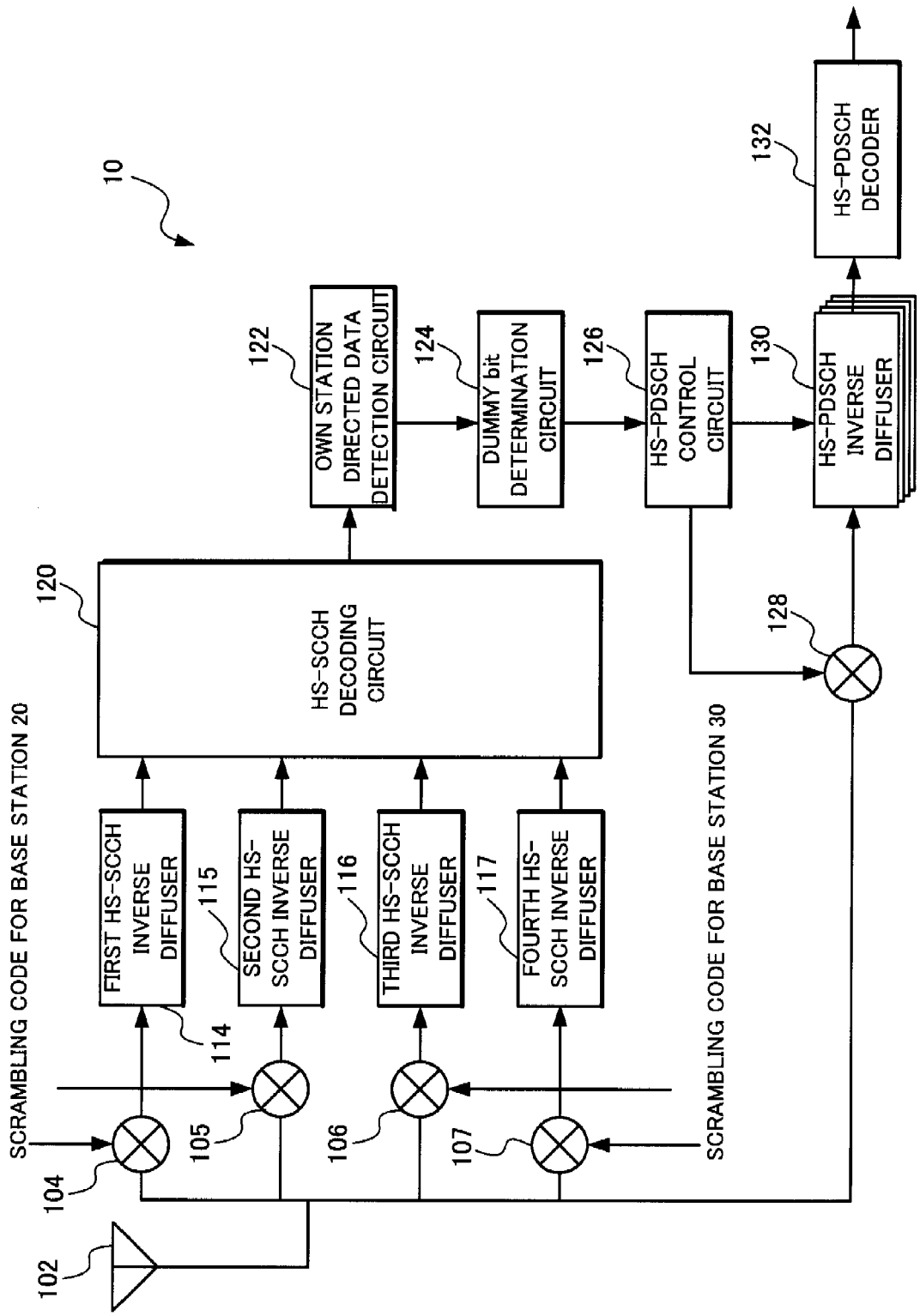
FIG. 3 is a functional block diagram showing a main part of a structure of a mobile terminal according to the exemplary embodiment of the present invention.

FIG. 3 is a functional block diagram showing a structure of a main part of the mobile terminal 10 according to the present exemplary embodiment. The mobile terminal 10 of the exemplary embodiment of the present invention, a mobile terminal which executes communication based on HSDPA communication mode with a plurality of base stations (the first base station 20 and the second base station 30), which comprises a reception unit (antenna 102) for receiving an HS-SCCH signal, when moving from one base station (the first base station 20) to an area of another base station (the second base station 30), from the moving destination base station (the second base station 30), a determination unit (an own station directed data detection circuit 122 and a dummy bit determination circuit 124) for determining whether a dummy signal is included in an HS-SCCH signal received by the reception unit, a decoding unit (the dummy bit determination circuit 124) for executing decoding up to the part 2 information of an HS-SCCH signal when determination is made that the dummy signal is included, an examination unit (the dummy bit determination circuit 124) for examining a CRC included in the part 2 information, and a switching processing unit (an HS-PDSCH control circuit 126) for switching a base station when a CRC is normal. In FIG. 3, no description is made of structures of parts not related to the gist of the present invention.

In addition, the respective components of the mobile terminal 10 are realized by a CPU and a memory of an arbitrary computer, a program for realizing the components shown in the figure which is loaded into the memory, a storage unit such as a hard disk for storing the program, and an arbitrary combination of hardware and software centered around a network connection interface. Then, it is apparent to those skilled in the art that a realization method and a device therefor have various modifications. Each figure to be described in the following shows not a structure of a hardware unit but a block of a function unit.

More specifically, the mobile terminal 10 comprises the antenna 102, a plurality of multipliers connected to the antenna 102, a multiplier 104, a multiplier 105, a multiplier 106 and a multiplier 107, and a plurality of inverse diffusers connected to the plurality of multipliers, respectively, a first HS-SCCH inverse diffuser 114, a second HS-SCCH inverse diffuser 115, a third HS-SCCH inverse diffuser 116 and a fourth HS-SCCH inverse diffuser 117. The mobile terminal 10 further comprises an HS-SCCH decoding circuit 120, the own station directed data detection circuit 122, the dummy bit determination circuit 124, the HS-PDSCH control circuit 126, a multiplier 128, an HS-PDSCH inverse diffuser 130 and an HS-PDSCH decoder 132.

In FIG. 3, the multiplier 104 and the multiplier 105 receive input of a scrambling code for the first base station 20 and multiply a signal received at the antenna 102 by the code to output a result to the first HS-SCCH inverse diffuser 114 and the second HS-SCCH inverse diffuser 115, respectively. The multiplier 106 and the multiplier 107 receive input of a scrambling code for the second base station 30 and multiply a signal received at the antenna 102 by the code to output a result to the third HS-SCCH inverse diffuser 116 and the fourth HS-SCCH inverse diffuser 117, respectively. Shown in FIG. 3 is a state where the mobile terminal 10 exists in an area bridging over both the first base station area 22 and the second base station area 32 illustrated in FIG. 1, that is, a state of the mobile terminal 10b.

In a case, for example, of the state of the mobile terminal 10a shown in FIG. 1, that is, a case where the mobile terminal 10 exists in the first base station area 22, the scrambling code for the first base station 20 is input to the four multipliers. On the other hand, in a case of the state of the mobile terminal 10c, that is, a case where the mobile terminal 10 exists in the second base station area 32, the scrambling code for the second base station 30 is input to the four multipliers. Switching of a scrambling code to be input to each multiplier is controlled by a control unit (not shown).

The first HS-SCCH inverse diffuser 114, the second HS-SCCH inverse diffuser 115, the third HS-SCCH inverse diffuser 116 and the fourth HS-SCCH inverse diffuser 117 multiply signals input from the multiplier 104, the multiplier 105, the multiplier 106 and the multiplier 107 by a channelisation code of an HS-SCCH to take out an HS-SCCH signal.

The HS-SCCH decoding circuit 120 decodes HS-SCCH signals input from the first HS-SCCH inverse diffuser 114, the second HS-SCCH inverse diffuser 115, the third HS-SCCH inverse diffuser 116 and the fourth HS-SCCH inverse diffuser 117 to take out information.

The own station directed data detection circuit 122 determines whether a relevant HS-SCCH is directed to its own terminal or not based on the part 1 information received from the HS-SCCH decoding circuit 120. The part 1 information includes UE ID inherent to the terminal. The own station directed data detection circuit 122 is allowed to take out UE ID from the part 1 information and determine whether the signal is directed to its own terminal or not based on the UE ID. As to an HS-SCCH signal, detailed description will be made in description of an HS-SCCH coding processing unit at a base station which will be made later.

The dummy bit determination circuit 124 determines whether a 7-bit bit string of a CCS corresponds to a dummy bit or not based on the part 1 information received from the HS-SCCH decoding circuit 120. In the present exemplary embodiment, the eight bit strings, ⌈1110000⌉, ⌈1110001⌉, ⌈1110010⌉, ⌈1110011⌉, ⌈1110100⌉, ⌈1110101⌉, ⌈1110110⌉ and ⌈1110111⌉ are used as a bit string indicative of HSDPA serving cell switching, that is, as a dummy bit. In other words, a dummy signal indicative of HSDPA serving cell switching includes any of the eight bit strings, ⌈1110000⌉, ⌈1110001⌉, ⌈1110010⌉, ⌈1110011⌉, ⌈1110100⌉, ⌈1110101⌉, ⌈1110110⌉ and ⌈1110111⌉ in the part 1 information of the HS-SCCH. When determining that a dummy signal is received, the dummy bit determination circuit 124 reads the HS-SCCH signal up to the part 2 information to check the CRC.

With which of the above-described eight bit strings is to be used as a dummy signal defined in advance between the base station and the mobile station, it is also possible to detect inclusion of a predetermined bit string in the part 1 information. Alternatively, determination whether a bit string corresponds to a dummy bit or not can be made by sensing inclusion of a bit string whose more significant three bits are all "1" in the part 1 information among the above-described 7-bit bit strings.

When the dummy bit determination circuit 124 receives a dummy signal directed to its own terminal and the CRC check finds normality, the HS-PDSCH control circuit 126 determines a scrambling code and a channelisation code of an HS-PDSCH to be inversely diffused and inverse diffusion timing based on information of the HS-SCCH signal handed over from the dummy bit determination circuit 124.

The multiplier 128 multiplies a signal received at the antenna 102 by a scrambling code of an HS-PDSCH obtained at the HS-PDSCH control circuit 126 and outputs a result to the HS-PDSCH inverse diffuser 130.

The HS-PDSCH inverse diffuser 130 executes inverse diffusion of an HS-PDSCH input from the multiplier 128 by using a channelisation code and timing designated by the HS-PDSCH control circuit 126.

The HS-PDSCH decoder 132 decodes a signal inversely diffused by the HS-PDSCH inverse diffuser 130 to take out data.

Figure 4:
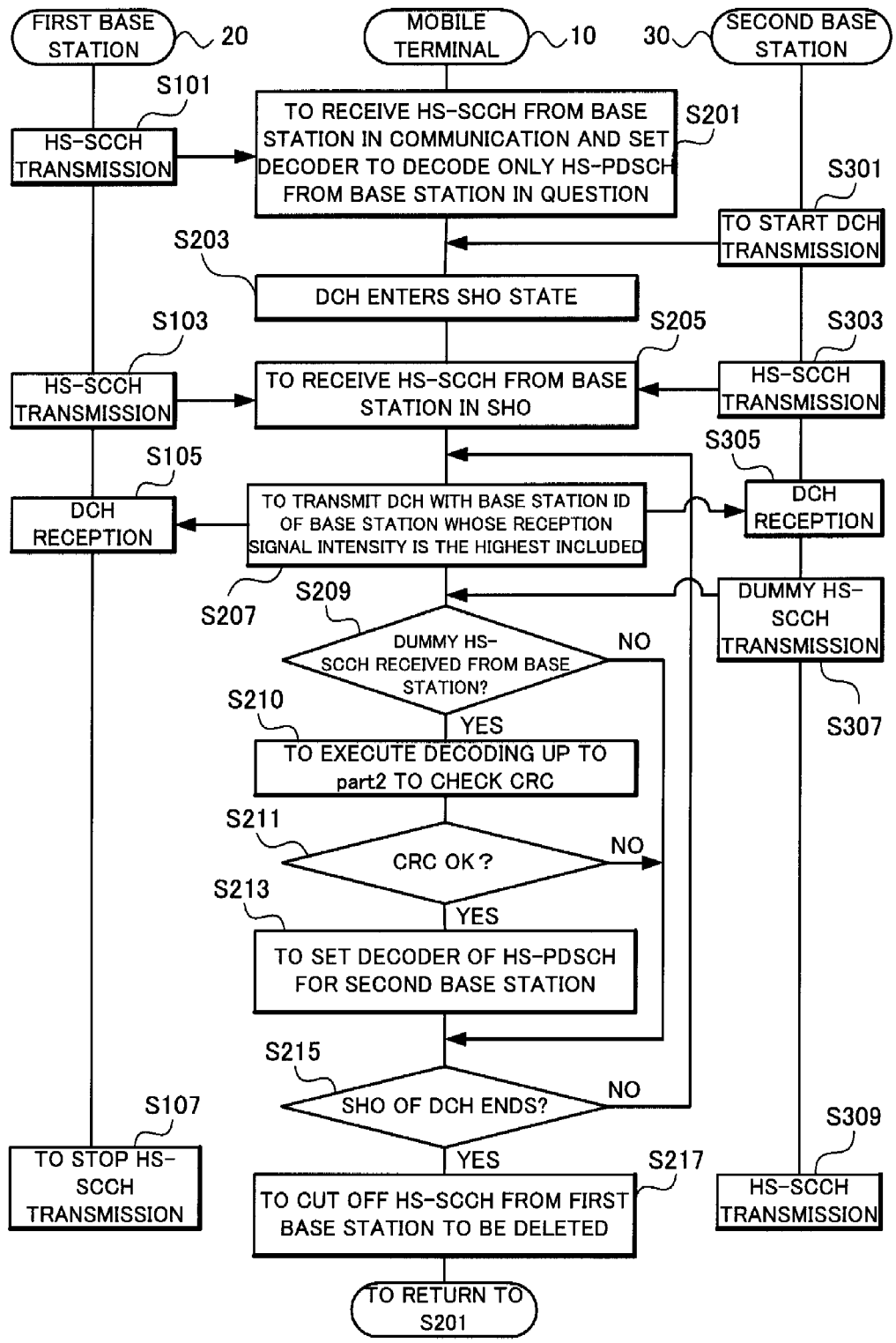
FIG. 4 is a flow chart showing one example of operation of the mobile communication system according to the exemplary embodiment of the present invention.

Operation of thus structured mobile communication system according to the present exemplary embodiment will be described in the following. FIG. 4 is a flow chart showing one example of operation of the mobile communication system according to the exemplary embodiment of the present invention. In the following, description will be made with reference to FIG. 1 through FIG. 4.

First, when the mobile terminal 10 is located at the position of the mobile terminal 10a, that is, it exists in the first base station area 22 as shown in FIG. 1, the terminal receives an HS-SCCH signal from the first base station 20. At this time, the HS-PDSCH decoder 132 of the mobile terminal 10 is set to decode only an HS-PDSCH from the first base station 20 (Step S101 and Step S201).

Then, when the mobile terminal 10 moves to locate at the position of the mobile terminal 10b, DCH enters an SHO state by signaling from the control device 40 to add another base station (the second base station 30). Then, the second base station 30 starts transmission of DCH (Step S301).

Then, at the mobile terminal 10, an SHO detection unit (not shown) detects the DCH attaining SHO (Step S203) and a control unit (not shown) receives an HS-SCCH also from the added second base station 30 in addition to the HS-SCCH from the first base station 20 from which an HS-SCCH is originally received. Then, the first HS-SCCH inverse diffuser 114, the second HS-SCCH inverse diffuser 115, the third HS-SCCH inverse diffuser 116 and the fourth HS-SCCH inverse diffuser 117 receive HS-SCCH from both the first base station 20 and the second base station 30 through the antenna 102 (Step S103, Step S303 and Step S205).

At this time, the control unit limits the number of HS-SCCH received from each base station such that the total number of HS-SCCH received is within the maximum number of HS-SCCH which can be received by the mobile terminal 10, that is, the maximum number of four here. Also at this time, the control unit switches a scrambling code input to the multiplier 104, the multiplier 105, the multiplier 106 and the multiplier 107 to one for the corresponding base station and multiplies the signal received at the antenna 102 by the code to apply the result to each of the HS-SCCH inverse diffusers.

While receiving HS-SCCH from the plurality of base stations, a signal intensity measuring unit (not shown) at the mobile terminal 10 measures a signal intensity of each base station. Then, periodically or only when a base station whose signal intensity is the highest changes, a notification unit (not shown) notifies the control device 40 of a base station ID of the base station whose reception signal intensity is the highest through each base station by transmission of DCH including the base station ID (Step S207, Step S105 and Step S305).

The control device 40 determines from which base station HS-PDSCH is to be transmitted based on information of a base station ID transmitted from the mobile terminal 10 and when a base station is to be changed, determines base station switching (not shown). When switching is determined, the control device 40 instructs a switching destination base station, the second base station 30 here, on switching. In response to the switching instruction, the second base station 30 transmits a dummy HS-SCCH signal indicative of base station switching (Step S307).

Here, the dummy HS-SCCH signal includes any of eight bit strings, [1110000], [1110001], [1110010], [1110011], [1110100], [1110101], [1110110] and [1110111] bit string indicative of CCS of the part 1 information.

At the mobile terminal 10, when determining that HS-SCCH including any of the above-described bit strings in the part 1 information is received from a base station (the second base station 30) different from the base station (the first base station 20) from which the HS-PDSCH has been received so far (YES at Step S209), the own station directed data detection circuit 122 and the dummy bit determination circuit 124 cancel an ordinary HS-PDSCH reception procedure.

Then, read HS-SCCH up to the part 2 information and decode the signal to check CRC (Step S210). When CRC goes OK (YES at Step S211), the HS-PDSCH control circuit 126 determines that a base station to which HS-PDSCH is to be transmitted is changed to set the decoder of the HS-PDSCH for the base station (the second base station 30) that has transmitted the HS-SCCH (Step S213). Hereafter, HS-SCCH will be transmitted from the second base station 30 (Step S309) and the mobile terminal 10 executes ordinary reception operation.

Thereafter, when SHO of DCH ends (YES at Step S215) due to signaling (not shown) from the control device 40, cut off HS-SCCH reception from the base station to be deleted (the first base station 20) (Step S217). Then, assign the limited number of HS-SCCH receptions to the remaining base station (the second base station 30) to increase the number of HS-SCCH receptions. The first base station 20 stops transmission of HS-SCCH to the mobile terminal 10 (Step S107). Then, return to Step S201.

It is also possible to omit check of DCH at Step S215, and when OK of CRC is confirmed at Step S211, upon start of decoding of HS-PDSCH at Step S213, cut off reception of HS-SCCH from the first base station 20.

FIG. 5 is a diagram for use in explaining reception of HS-SCCH at the above-described base station switching at the mobile terminal 10. In the figure, a code indicated by an arrow represents correspondence to the step number in the flow chart of FIG. 4.

In a period between an arrow 5201 and an arrow S203, at the mobile terminal 10, the control unit executes control to receive four HS-SCCH from the first base station 20, which are input to the first HS-SCCH inverse diffuser 114, the second HS-SCCH inverse diffuser 115, the third HS-SCCH inverse diffuser 116 and the fourth HS-SCCH inverse diffuser 117.

Then, at the point indicated by the arrow S203, when DCH attains SHO with the second base station 30 due to signaling from the control device 40, the control unit controls the number of HS-SCCH received from the first base station 20 to be two, so that the signals are input only to the first HS-SCCH inverse diffuser 114 and the second HS-SCCH inverse diffuser 115.

Then, at the point indicated by an arrow 5205, the control unit executes control to start receiving two HS-SCCH from the second base station 30, so that the signals are input to the third HS-SCCH inverse diffuser 116 and the fourth HS-SCCH inverse diffuser 117. At this time, the control unit switches a scrambling code to be input to the multiplier 106 and the multiplier 107 to a code for the second base station 30.

Then, at the point indicated by an arrow 5307, a dummy HS-SCCH is transmitted from the second base station 30 and received at the mobile terminal 10 to check CRC at the point indicated by an arrow 211. The CRC is determined to be normal to set a decoder of the HS-PDSCH for the second base station 30. Then, at the point indicated by an arrow 5217, when SHO of DCH ends due to signaling from the control device 40, the control unit cuts off the HS-SCCH from the base station (the first base station 20) to be deleted.

Then, again at the point indicated by the arrow 5201, the control unit controls the number of HS-SCCH to be received from the second base station 30 to be four, so that the signals are input to the first HS-SCCH inverse diffuser 114, the second HS-SCCH inverse diffuser 115, the third HS-SCCH inverse diffuser 116 and the fourth HS-SCCH inverse diffuser 117. At this time, the control unit switches a scrambling code to be input to the multiplier 104 and the multiplier 105 to a code for the second base station 30.

As described in the foregoing, since the mobile communication system according to the exemplary embodiment of the present invention enables base station switching after the part 1 information of an HS-SCCH including a dummy bit indicative of base station switching is transmitted from a base station (the first base station 20) as an handover destination prior to actual data transmission and the mobile terminal 10 side makes confirmation by CRC check in response to dummy bit detection, a probability of erroneous HSDPA serving cell switching due to erroneous detection of a signal can be reduced. This improves reliability of the system.

In addition, since detection of dummy signal reception, that is, trigger detection for base station switching, is enabled only by reception and decoding of the part 1 information, base station switching monitoring processing can be simplified to reduce a processing time. Furthermore, since no decoding up to the part 2 information of the HS-SCCH signal is executed before reception of a dummy signal directed to its own station, time-consuming unnecessary processing can be saved to improve processing efficiency, thereby enabling high-speed processing. In addition, since a bit string of the part 1 information yet to be used is used as a dummy signal, no addition of a new signal is required to avoid complication of the structure.

Although the exemplary embodiment of the present invention has been described in the foregoing with reference to the drawings, the same is by way of illustration and example only and other various forms than those described above can be adopted.

Although the above exemplary embodiment has been described with respect to an example of a mobile communication system applied to handover processing at the time of switching among a plurality of base stations, it is not limited to the same. The system is applicable, for example, to handover processing at the time of switching among a plurality of cells in the same base station. While in the handover processing among the plurality of base stations, communication timing among the respective base stations differs, it will be the same among the cells, which simplifies operation control.

According to the exemplary embodiments of the present invention, when a mobile station moves from one base station to another base station, in response to reception of a dummy signal indicative of switching which is transmitted from a base station, CRC is checked based on part 2 information of an HS-SCCH signal before switching, and after confirmation of normality, the base station switching is executed, so that a possibility of erroneous base station switching due to erroneous detection of a signal can be reduced.

In the above-described communication method, the dummy signal may be included in part 1 information of the HS-SCCH signal. According to this arrangement, only with reception and decoding of the part 1 information, detection of dummy signal reception, that is, trigger detection at the time of base station switching, is enabled to simplify base station switching monitoring processing and reduce a processing time period.

In the above-described communication method, the mobile station is allowed to refrain from decoding up to the part 2 information of the HS-SCCH signal until receiving the dummy signal. According to this arrangement, since no decoding up to the part 2 information of the HS-SCCH signal is executed before reception of an own station directed dummy signal, time-consuming unnecessary processing can be saved to improve processing efficiency and enable high-speed processing.

In the above-described communication method, the dummy signal is allowed to function as a signal which instructs on switching by the inclusion of any of eight 7-bit strings indicative of a channelisation code set, ⌈1110000⌉, ⌈1110001⌉, ⌈1110010⌉, ⌈1110011⌉, ⌈1110100⌉, ⌈1110101⌉, ⌈1110110⌉ and ⌈1110111⌉ in the part 1 information of the HS-SCCH signal. According to this arrangement, since a bit string yet to be used of the part 1 information is used as a dummy signal, no addition of a new signal is required to avoid complication of a structure.

An arbitrary combination of the foregoing components and conversion of the expressions of the present invention into a method, a device, a system, a recording medium and a computer program are also effective as a mode of the present invention.

The exemplary embodiments provides a mobile communication method which enables a possibility of erroneous base station switching due to erroneous detection of a signal to be reduced and reliability of a mobile communication system to be improved.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-377766, filed on Dec. 28, 2005, the disclosure of which is incorporated herein in its entirety by reference.

The invention claimed is:

1. A mobile communication method of allowing a mobile station and a base station to communicate based on an HSDPA communication mode, comprising:
when said mobile station moves from one base station into an area of other base station, transmitting a dummy signal for notifying base station switching from said other base station as a moving destination to said mobile station prior to transmission of actual information;
in response to reception of said dummy signal, decoding an HS-SCCH signal up to part 2 information by said mobile station;
examining CRC included in said part 2 information; and when said CRC is normal, switching said base station,
wherein said dummy signal is included in part 1 information of said HS-SCCH signal, and
wherein said dummy signal functions as a signal for instructing on switching by the inclusion, in said part 1 information of said HS-SCCH signal, any of eight bit strings which are 7-bit bit strings indicative of a channelisation code set, ⌈1110000⌉, ⌈1110001⌉, ⌈1110010⌉, ⌈1110011⌉, ⌈1110100⌉, ⌈1110101⌉, ⌈1110110⌉, and ⌈1110111⌉.

2. The mobile communication method according to claim 1, wherein
said mobile station refrains from decoding up to said part 2 information of said HS-SCCH signal until reception of said dummy signal.

3. A mobile communication system including a control device for controlling a plurality of base stations in which a mobile station communicates with the plurality of base stations based on an HSDPA communication mode, wherein
said control device includes a switching instruction unit for monitoring need/no-need of change of a base station connected to said mobile station while said mobile station moves from one base station into an area of other base station, and when said change is necessary, instructing said other base station on switching,
said base station includes a generation unit for generating a dummy signal according to said switching instruction, and a transmission unit for transmitting said dummy signal to said mobile station, and
said mobile station includes a reception unit for receiving said HS-SCCH signal, a determination unit for determining whether said dummy signal is included in said received HS-SCCH signal, a decoding unit for decoding said HS-SCCH signal up to part 2 information when said determination unit determines that said dummy signal is included, an examination unit for examining CRC included in said part 2 information, and a switching processing unit for switching said base station when said CRC is normal,
wherein said dummy signal is included in part 1 information of said HS-SCCH signal, and
wherein said dummy signal functions as a signal for instructing on switching by the inclusion, in said part 1 information of said HS-SCCH signal, any of eight bit strings which are 7-bit bit strings indicative of a channelisation code set, ⌈1110000⌉, ⌈1110001⌉, ⌈1110010⌉, ⌈1110011⌉, ⌈1110100⌉, ⌈1110101⌉, ⌈1110110⌉, and ⌈1110111⌉.

4. The mobile communication system according to claim 3, wherein
said mobile station refrains from decoding up to said part 2 information of said HS-SCCH signal until reception of said dummy signal.

5. A mobile terminal for executing communication with a plurality of base stations based on an HSDPA communication mode, comprising:
a reception unit for, when moving from one base station into an area of other base station, receiving an HS-SCCH signal from said base station as a moving destination;
a determination unit for determining whether a dummy signal is included in said HS-SCCH signal received by said reception unit;
a decoding unit for decoding said HS-SCCH signal up to part 2 information when said determination unit determines that said dummy signal is included;
an examination unit for examining CRC included in said part 2 information; and a switching processing unit for switching said base station when said CRC is normal,
wherein said dummy signal is included in part 1 information of said HS-SCCH signal, and
wherein said determination unit determines that a dummy signal is included when said part 1 information of said HS-SCCH signal includes any of eight bit strings which are 7-bit bit strings indicative of a channelisation code set, [1110000], [1110001], [1110010], [1110011], [1110100], [1110101], [1110110], and [1110111].

6. The mobile terminal according to claim 5, which refrains from decoding up to said part 2 information of said HS-SCCH signal until reception of said dummy signal.

7. A non-transitory computer readable medium storing a communication program on a mobile terminal for executing communication with a plurality of base stations based on an HSDPA communication mode, wherein said communication program causes a computer realizing said mobile terminal to execute:

processing of receiving an HS-SCCH signal, when moving from one base station into an area of other base station, from said base station as a moving destination;

processing of determining whether a dummy signal is included in said HS-SCCH signal received by said reception unit;

processing of decoding said HS-SCCH signal up to part 2 information when determining that said dummy signal is included;

processing of examining CRC included in said part 2 information; and processing of switching said base station when said CRC is normal, wherein said dummy signal is included in part 1 information of said HS-SCCH signal, and wherein said determination unit determines that a dummy signal is included when said part 1 information of said HS-SCCH signal includes any of eight bit strings which are 7-bit bit strings indicative of a channelisation code set, [1110000], [1110001], [1110010], [1110011], [1110100], [1110101], [1110110], and [1110111].

* * * * *

UNITED STATES PATENT AND TRADEMARK OFFICE
CERTIFICATE OF CORRECTION

PATENT NO. : 8,259,674 B2
APPLICATION NO. : 12/159342
DATED : September 4, 2012
INVENTOR(S) : Shinya Shimobayashi Page 1 of 1

It is certified that error appears in the above-identified patent and that said Letters Patent is hereby corrected as shown below:

In the Specification

Column 3, Line 65: Delete "$10\rfloor$" and insert -- $10b\rfloor$ --

Column 3, Line 65: Delete "$10\rfloor$" and insert -- $10c\rfloor$ --

Column 5, Line 4-6: Delete "$x_{ccs,4}, x_{ccs,5}, x_{ccs,6}, x_{ccs,7} = |O+1\lfloor P/8 \rfloor * 15|$," and insert -- $x_{ccs,1}, x_{ccs,2}, x_{ccs,3} = \min(P-1, 15-P)$;

$x_{ccs,4}, x_{ccs,5}, x_{ccs,6}, x_{ccs,7} = |O-1-\lfloor P/8 \rfloor * 15|$ --

Column 9, Line 44: Delete "5201" and insert -- S201 --
Column 9, Line 58: Delete "5205" and insert -- S205 --
Column 9, Line 65: Delete "5307" and insert -- S307 --
Column 10, Line 7: Delete "5201" and insert -- S201 --

Signed and Sealed this
Twenty-first Day of October, 2014

Michelle K. Lee
*Deputy Director of the United States Patent and Trademark Office*